(12) United States Patent
Ebina et al.

(10) Patent No.: US 7,088,508 B2
(45) Date of Patent: Aug. 8, 2006

(54) DOUBLE-SIDED LENS SHEET AND PROJECTION SCREEN

(75) Inventors: Kazuyoshi Ebina, Kita-katsushika-gun (JP); Takashi Abe, Satte (JP); Masaru Miyashita, Minami-saitama-gun (JP); Susumu Takahashi, Kashiwa (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 10/344,999

(22) PCT Filed: Jun. 18, 2002

(86) PCT No.: PCT/JP02/06065

§ 371 (c)(1),
(2), (4) Date: Feb. 20, 2003

(87) PCT Pub. No.: WO02/103454

PCT Pub. Date: Dec. 27, 2002

(65) Prior Publication Data

US 2003/0169332 A1   Sep. 11, 2003

(30) Foreign Application Priority Data

Jun. 18, 2001 (JP) .............................. 2001-183059

(51) Int. Cl.
*G03B 21/60* (2006.01)
*G03B 21/56* (2006.01)

(52) U.S. Cl. ...................... 359/455; 359/457; 359/619; 359/449; 359/451; 359/452

(58) Field of Classification Search ........ 359/455–457, 359/619, 449, 451–452, 460
See application file for complete search history.

(56) References Cited

U.S. PATENT DOCUMENTS

| | | | | |
|---|---|---|---|---|
| 5,020,877 | A * | 6/1991 | Yokoo et al. | 359/457 |
| 5,870,224 | A * | 2/1999 | Saitoh et al. | 359/456 |
| 6,113,251 | A * | 9/2000 | Miyata | 362/333 |
| 6,278,546 | B1 * | 8/2001 | Dubin et al. | 359/452 |
| 6,307,675 | B1 * | 10/2001 | Abe et al. | 359/457 |
| 6,317,263 | B1 * | 11/2001 | Moshrefzadeh et al. | 359/443 |
| 6,353,500 | B1 * | 3/2002 | Guigan et al. | 359/456 |
| 6,469,830 | B1 * | 10/2002 | Dubin et al. | 359/449 |
| 2004/0004770 | A1 * | 1/2004 | Ebina et al. | 359/648 |

FOREIGN PATENT DOCUMENTS

| | | |
|---|---|---|
| JP | 59-129843 | 7/1984 |
| JP | 03-113434 | 5/1991 |
| JP | 04-296740 | 10/1992 |
| JP | 2000-111708 | 4/2000 |

* cited by examiner

*Primary Examiner*—W. B. Perkey
*Assistant Examiner*—Magda Cruz

(57) ABSTRACT

In order to provide a dual-surface lens sheet in which a color shift is reduced and positions of unit lenses on a front surface and a back surface are easily aligned even if the unit lenses are disposed in fine pitch when used for a rear projection screen which is used for a display device using a plurality of projector as light sources, a half-column-cylindrical-convex-lens is used in a lens sheet having lens sections on front surface and a back surface such that pitch ratio for disposing the unit lenses on the front surface and the back surface is in a range of 1:2 to 1:30 and disposition directions of the lens sections are uniform.

20 Claims, 13 Drawing Sheets

MAXIMUM SCALE : +/− 20.000 MICRONS
TRANSVERSE RAY PAN PLOT

10

MAXIMUM SCALE : +/− 5.000 MICRONS
TRANSVERSE RAY PAN PLOT

THICKNESS OF LENS

DOUBLE-SIDED LENS SHEET AND PROJECTION SCREEN

TECHNICAL FIELD

The present invention relates to a lens sheet which is effective when it is used for an image displaying screen (hereinafter called a transmission projection screen, or a rear projection screen) to be used for a rear projection television.

BACKGROUND ART

Commonly, in a transmission projection screen, a Fresnel lens sheet and a lenticular sheet are assembled.

FIG. 15 is a general view for a television having conventional three-tube projector. In FIG. 15, reference numerals 51, 52, and 53 indicate image projection devices for colors such as R, G, and B. Reference numeral 54 indicates a mirror. Reference numeral 55 indicates a transmission projection screen.

A Fresnel lens sheet in FIG. 16 emits a light (which disperses from a small-diameter lens) which is projected from a projector to a lenticular sheet 57 as an approximate parallel light by using a converging lens.

The lenticular sheet 57 widens horizontally a range of the projected light which is incident as an approximate parallel light by the Fresnel lens sheet 56 so as to emit to a person who observes the light by using a characterized feature of a cylindrical lens group which are disposed in horizontal direction.

Also, in a rear-projection screen, customarily, a light diffusing layer is formed for purposes of widening a display light in a vertical direction, making the projected light from the projector focused, and reducing unnecessary blinking which is called a scintillation in the image because of small diameter of the lens in the projector.

The light diffusing layer is formed in at least any one among a lenticular sheet, Fresnel lens sheet, or a front board such as a protection board. For forming the light diffusing layer, methods such as applying methods, layering methods, and mixing methods can be employed preferably.

For a rear projection TV, according to a method which is used in a projector (light source), there are variations such as CRT method according to the three-tube (R, G, B) method, liquid crystal method, reflection light bulb method which is otherwise called as a digital-micromirror-device (DMD, Trademark registered by Texas Instruments (TI) or digital-light-processing (DLP). Liquid crystal method and reflection light bulb method are in so-called a single-tube method in which there is one set of projector.

In a conventional lenticular sheet which is used in a rear projection screen which is used for a rear projection TV according to CRT method, a lens section on a front surface and on a back surface are half-column-convex-shaped-cylindrical-lens-group in a uniform disposition direction, the disposition pitch of the unit lenses on a front surface and a back surface is 1:1 under accurate alignment condition (not shown in the drawings).

The above structure is employed because the projected light from each projector is emitted under offset angle condition each other when three projectors for three colors such as R, G, and B are disposed in a horizontal direction.

When the projected lights for R, G, and B are emitted from the projectors under offset angle condition, images according to three primary colors are mixed without position shift. Thus, observable angle is limited. When viewpoint is moved horizontally, image looks somewhat in red or in blue. Such observation accompanied with changed color is called "color shift".

In order to solve the color shift, it is necessary to adapt a dual-surface lenticular sheet in which half-column-cylindrical-lens-group are formed on a front surface and a back surface, the disposition pitch of the unit lens on the front surface and the back surface is in relationship of 1:1, unit lenses which are to be a pair on the front surface and the back surface are accurately aligned.

Also, the shape of the unit lenses on the front surface and the back surface is designed by taking the refractive index corresponding to the wavelength such that the scope of the image for primary colors such as R, G, and B of which optical paths are slightly offset overlapping in a uniform optical intensity should be as large as possible.

In order to provide a high resolution image quality, in the lens sheet contained in the screen, narrow pitch (fine pitch) disposition in the unit lens is required. In order to produce a dual-surface-lenticular-sheet, alignment in the unit lens on the front surface and the back surface is more difficult.

Also, along with realization in finer resolution in parallel disposition pitch for a unit lens, finer resolution for a light transmitting section in a shading pattern (Black Matrix hereinafter called BM) which is formed away from the lens section has been realized. Therefore, accuracy for forming an aperture section in a light condensing section where a light is condensed by the micro-lens array section clearly is required.

In case of a lens sheet having a fine pitch lens section, a black matrix is formed by so called a self-alignment method in which positions of non-light-condensing section for the lens are determined accurately by using light condensing characteristics by the lens to a photosensitive resin layer which is formed on the lens sheet away from the lens.

For self alignment method, there are a wet method in which the shading pattern is formed after developing the exposed photosensitive resin layer, or a dry method in which the shading pattern is formed applying a color without developing the exposed photosensitive resin layer.

In dry method, a photosensitive adhesion agent having a characteristics in which bonding characteristics occurs according to whether or not light is exposed is used, and a color is applied corresponding to the adhesion.

In order to form a BM having preferable shading ratio (for obtaining preferable contrast in image, a range such as more than 60% is experimentally preferable) for a transmission liquid crystal projection screen, the position of light condensation (focus) by the lens section is set preferably according to the shading ratio in the formed pattern in the photosensitive resin layer not on the light emission of the photosensitive resin layer.

In a case in which a lens is spherical, positions of focal point are different between in the center of the lens and marginal area of the lens according to aberration. Therefore, in a case in which the shading pattern is formed by the self alignment method, the position where the characteristics of the photosensitive resin layer changes cannot be determined precisely. Therefore, a borderline between the aperture section and the shading section is hardly clear.

In particular, in a case in which the shading ratio is enhanced so as to realize an image with higher contrast, there is a problem in that it is difficult to form a BM having a clear borderline between a fine aperture section and the shading section when parallel disposition pitch between the unit lens is very fine and each one of the unit lens is fine.

In a conventional light transmission screen which is used in a rear-projection television which is sold in a market, it is common that a Fresnel lens having a concentric gaps are formed on one surface and a lenticular lens in which cylindrical lenses are disposed in one direction are provided. A case in which either one of them is used is acceptable. Also a case in which a light diffusing layer is provided on other member can be common.

In members which is contained in these transmission screens, optical disposition is arranged such that the lights which are emitted from the projector are in approximate parallel state by the Fresnel lens so as to obtain horizontal perspective angle by widening the emitted light in a horizontal direction in the image by the lenticular lens and vertical perspective angle by widening the emitted light in a vertical direction in the image by the light diffusing member.

Furthermore, a transmission screen which can obtain a brighter and clearer image quality is known by replacing the lenticular lens by a micro-lens sheet which can obtain the horizontal perspective angle and the vertical perspective angle compatibly without using the light diffusing member and by discontinuing or reducing the use of the light diffusing member.

Also, a method in which two lenticular layers are used such that longitudinal directions of the cylindrical lenses are orthogonal, or a method in which the cylindrical lenses are disposed on both surfaces of one base member layer such that the longitudinal directions of the cylindrical lenses are orthogonal are known.

Also, a structure in which a shading layer having aperture sections is provided in a light condensing section of each of the cylindrical lens contained in the lenticular lens or in the light condensing section of each of the micro-lens contained in the micro-lens array sheet so as to improve S/N ratio of the screen is known.

Also, there is a case in which a hardcoat layer or a anti-reflection layer (hereinafter called AR layer) are provided an outermost surface according to a usage of these transmission screen.

In a transmission screen using a conventional lenticular sheet or a micro-lens sheet, a lenticular layer and a diffusion layer are combined so as to control the perspective angle in a horizontal direction and a vertical direction. In the micro-lens array, wider perspective angle is necessary; therefore, there are disadvantages such as deteriorated quality in the image due to absorption of light by the diffusion layer and white scattering, and reduced screen gain caused by wide diffusion.

Also, it is possible to propose to control the perspective angle in a horizontal direction and a vertical direction by using two lenticular layer in which longitudinal direction of each cylindrical lenses are orthogonal, or by disposing a plurality of cylindrical lens on both surfaces of one base member layer such that longitudinal directions of each of the cylindrical lens are orthogonal. In such cases, quantity of the members contained in the cylindrical lens becomes doubled, and very fine manufacturing process for lens also becomes doubled. Thus, there is a problem in that cost for parts and manufacturing process become expensive.

Also, in a screen in which two lenticular lenses are disposed on one plane surface so as to be orthogonal each other, two lenticular lenses overlap each other. Therefore, if shape of one lenticular lens changes, optical characteristics in the other lenticular lens changes accordingly. Thus, it is not possible to control the perspective angle by independently changing the shape of one of the lenticular lenses.

Therefore, there is a limit for controlling range for the perspective angle; thus, such a limit is not preferable from practical point of view.

Furthermore, in order to use a micro-lens array for a transmission screen, it is necessary to produce in a worthwhile size for the purpose such as 50 inches in diagonal plane. In such a case, a lens thug (thickness of refractive surface) having nearly half a diameter of an element lens is necessary for obtaining wider perspective angle. However, it is difficult to compatibly realize such depth in lens thug and picture size because of the depth to be molded. Because of this, even if necessary optical performance can be realized as long as an image area is small, due to a problem in manufacturing process, it is difficult to enlarge the image area.

DISCLOSURE OF INVENTION

A main object of the present invention is to provide a dual-surface lens sheet such that the color shift is reduced when it is used for a rear projection screen which is used in a displaying device in which a plurality of projector such as three-tube CRT projector are used as light source, it is easy to align the position of the unit lenses on the front surface and the back surface even if the unit lenses are disposed in fine pitch; thus the difficulty in the manufacturing process does not increase.

Yet, another object of the present invention is, in a micro-lens sheet which is preferable for a lens sheet to be used for a transmission projection screen having two lens sheets in combination particularly with a Fresnel lens, to provide a micro-lens sheet in which the unit lens group is disposed in a pitch as fine as 200 μm or finer, and it is possible to control such that the perspective scope of the emission direction of the display light by the lens section can be wide.

Yet another object of the present invention is to provide a micro-lens sheet which can easily form a fine BM in which a borderline between an aperture section and the shading section is clear when a BM having a high shading ratio (75%) is formed on a micro-lens sheet away from the lens section.

Yet another object of the present invention is to provide a projection screen using a micro-lens having sufficient optical characteristics for a screen with less optical absorption, less gain reduction, and controlled white scattering easily with large area.

Yet another object of the present invention is to provide a projection screen using a micro-lens of which material cost and manufacturing cost are inexpensive.

A first aspect of the present invention is a dual-surface lens sheet having periodical gaps contained in a lens sections on a front surface and a back surface in a lens sheet wherein pitch ratio of the unit lens on the front surface and the back surface is in a range of 1:2 to 1:30.

The lens sections on the front surface and the back surface in the dual lens sheet are usually used in aspects such as; (1) in a half-column-cylindrical-convex-lens of which disposition directions are uniform; (2) in a micro-lens array section in which the unit lenses are in secondary dimensional approximate matrix disposition; and (3) in a micro-lens array section in which one of the unit lens is a half-column-cylindrical-convex-lens and the other unit lens is made such that the unit lenses are in secondary dimensional approximate disposition.

In a case of above (3), the pitch ratio in which the unit lenses are disposed in the a half-column-cylindrical-convex-lens and the micro-lens array section should preferably be in a range of 2:1 to 30:1.

It is acceptable that the micro-lens array section may be made of a reacted hardened product of the radioactive-ray-curable-resin and include the unit lens having aspherical shape. Also, it is acceptable that the micro-lens array section may have only a unit lens having spherical shape. In order to dispose the unit lens groups in fine pitch, it is preferable to form the micro-lens array section by performing a molding operation by using the radioactive-ray-curable-resin.

It is also acceptable that the micro-lens array section may be made only of the unit lens having spherical shape.

Any variation in disposition of the unit lens may be acceptable. A matrix disposition which is neatly disposed in grid form, a delta disposition in which the distance between the unit lenses is uniform, a honeycomb disposition in which shape of the unit lens is a hexagon using the delta disposition can be acceptable. Also, a disposition in which an array n and an array n+1 (n is an integer) contained in the lens array section in the matrix disposition are in an offset disposition by half a pitch. A shape of the unit lens area may be a rectangle or a triangle. A triangle formed by neighboring unit lens areas can be a regular triangle sometime, and it cannot be a regular triangle sometime. By using such different cases, it is possible to change the light diffusion characteristics in a horizontal direction and a vertical direction.

It is acceptable that, in the micro-lens array section, optical diffusion by the lens function in each unit lens is different in a horizontal direction and a vertical direction.

In order to produce the above dual-surface lens sheet easily, it is necessary that periodical gaps are formed for forming the lens section on one surface of the micro-lens sheet, the other surface is flat, the lens sheets are layered such that the flat surfaces of each sheet are corresponding.

It is preferable that, in a micro-lens sheet, a shading layer is formed in an area corresponding to a non-light-condensing section by each unit lens on a flat surface of at least one of the lens sheet away from the lens section so as to improve the contrast in the display image.

It is acceptable that, in a dual lens sheet, a unit lens having convex shape is disposed in the lens section, a focusing surface of at least one of the lens section exists in the dual lens sheet, parallel lights which is incident to one of the unit lens pass through a plurality of unit lens in the other lens section when emitted from the lens section in the other lens section.

A rear projection screen in which a dual-surface lens sheet according to any one of the above aspects and a Fresnel lens are assembled is characterized in that, a lens section in which the unit lens in the dual lens sheet is disposed in larger pitch and the lens section in the Fresnel lens sheet are faced such that the Fresnel lens sheet is disposed near a plurality of projector (light source).

The above rear projection screen is preferable to be used in a display device having a light source of the three-tube CRT projector. The theory is explained as follows.

Optical characteristics of a "single face lens sheet" having a lens section in which a unit lenses (convex lenses) are disposed on only one surface is shown in FIG. 1A. The image light is emitted from the projector for B (blue) such that the display light is emitted perpendicularly toward a center of the single-face lens sheet from the lens section. Also, the image lights are emitted from the projectors for G (green) and R (red) under slightly offset condition disposed in horizontal ends. Distribution in the brightness of each image light which is emitted from the flat surface on the other surface is shown in FIG. 1A.

In the drawing, a curve B indicates a symmetrical distribution having a peak in 0 degree. Curves G, and R indicate distributions in which peak is slightly offset from 0 degree. The region in which three primary colors are mixed uniformly is in a small range around 0 degree (in a horizontal direction in the drawing). Unless it is out of the range, green is strong in a left-hand side of the range, and red is strong in a right-hand side of the range.

In FIG. 1B, optical characteristics in the "dual-surface lens sheet" according to the present invention having a lens section in which the unit lenses (convex lenses) are disposed on both surfaces is shown.

In the dual-surface lens sheet, comparing to a case in which the emission surface is flat, a range in which the parallel lights which are incident from one of unit lens disposed in incident area refracts to be emitted is broadened. The curve which indicates the brightness distribution for each color is softly wide in horizontal directions. The center of the range in which the three-primary colors are uniformly mixed is in 0 degree. Such a range is wider than the case shown in FIG. 1A (in horizontal direction in the drawing). The image stronger in green and the image stronger in red can be observed in wider angle than in the case of FIG. 1A.

This means that the color shift can be reduced. In order to reduce the color shift further, it is necessary to broaden the range in which the three-primary-colors are uniformly mixed so as to reduce areas having strong green and strong red.

In order to broaden the range in which the parallel lights which are incident from one unit lens in the incident side refract to be emitted, by simply using a single-face lens sheet in which the disposition angle by the unit lens in the incident side is broadened, similar effect can be obtained. However, it is difficult to produce a lens sheet having a lens which focal length is short. Therefore, it is difficult to control the mixture ratio for the three-primary-colors. Thus, in order to realize the above effect, it is preferable to use the dual-surface lens sheet.

In every aspect of the present invention, in order to dispose the unit lens groups in highly fine pitch, it is preferable to form the micro-lens array section by using the radioactive-ray-curable-resin.

In this aspect of the present invention, it is acceptable that a micro-lens sheet has a micro-lens array section in which unit lenses are disposed in approximate matrix in a second dimensional manner on at least one surface of a base board wherein the micro-lens array section is formed such that a reacted product of a radioactive-ray-curable-resin is bonded on only one surface of the base board, the micro-lens array section includes the unit lens having an aspherical shape, and disposition pitch of neighboring unit lenses is 100 μm or shorter.

It is acceptable that, in a micro-lens sheet, the micro-lens array section has only the unit lens having aspherical shape.

Any variation in disposition of the unit lens may be acceptable. A matrix disposition which is neatly disposed in grid form, a delta disposition in which the distance between the unit lenses is uniform, a honeycomb disposition in which shape of the unit lens is a hexagon using the delta disposition can be acceptable. Also, a disposition in which an array n and an array n+1 (n is an integer) contained in the lens array section in the matrix disposition are in an offset disposition by half a pitch. A shape of the unit lens area may be a rectangle or a triangle. A triangle formed by neighboring unit lens areas can be a regular triangle sometime, and it cannot be a regular triangle sometime. By using such different cases, it is possible to change the light diffusion characteristics in a horizontal direction and a vertical direction. In order to improve contrast in a displayed image which is supposed to be observed in a rear projection screen, it is preferable that a shading layer is formed on a position on a surface of the base board which is disposed away from the micro-lens array section where a light is not condensed by each of unit lens.

A second aspect of the present invention is a micro-lens sheet having a micro-lens array section in which unit lenses are disposed in approximate matrix in a second dimensional manner on at least one surface of a base board wherein diameter for each of the unit lens and the disposition pitch is 200 μm or shorter, light emission angle which is emitted from each unit lens is more than ±30 degrees against a normal of a main surface of the micro-lens sheet; chromatic difference of magnification which is caused by each unit lens is designed to be in a range of 0% <chromatic difference of magnification ≦50% of the diameter of the lens.

A third aspect of the present invention is a projection screen having the micro-lens sheet having the micro-lens array section in which the unit lenses are disposed in an approximate matrix in a second-dimensional manner wherein a surface of the unit lens is formed in toric shape as a continuous surface such that curvature of cross sectional shape of the unit lens in one direction is smaller than that in an orthogonal direction to the particular direction, the micro-lens array section in which the unit lens is disposed in an approximate matrix in a second-dimension manner is formed on one surface of the transparent sheet, and the shading layer having the aperture section of which optical axis is aligned with the optical axis of unit lens group on a surface of the sheet which is disposed opposite to the micro-lens array section.

In a fourth aspect of the present invention, it is characterized in that, in a projection screen, directions of the curvature of each unit lens are uniformly disposed when the micro-lens array section in which the unit lens is disposed in an approximate matrix in a second-dimension manner is formed on one surface of the transparent sheet.

In a fifth aspect of the present invention, it is characterized in that, in a projection screen, lens thug of the toric surface which is a ratio between thickness of a curvature section in a one direction and thickness of a curvature section in a cross sectional surface in an orthogonal direction is 2/3 or smaller.

In a sixth aspect of the present invention, it is characterized in that, in a projection screen, lens thug of the toric surface which is a ratio between thickness of a curvature section in a horizontal direction and thickness of a curvature section in a cross sectional surface in a vertical direction is 2/3 or smaller.

In a seventh aspect of the present invention, it is characterized in that, in a projection screen, the micro-lens array section is formed on one surface of the transparent sheet which is disposed in an area from which a light is incident (near a projector) when the micro-lens array section is used for a transparent projection screen.

In an eighth aspect of the present invention, it is characterized in that, in a projection screen, the shading layer is formed in the non-light-condensing area on a surface of a base board opposite to the lens such that a light does not condense by exposing a light through the micro-lens array section, the photosensitive resin layer or a layer which is formed on a surface of the photosensitive resin layer is a base board for a lens such that the refractive index of the layer is lower than that of the transparent sheet.

In a ninth aspect of the present invention, it is characterized in that, in a projection screen farther has a Fresnel lens having a concentric ring band near a light incident region (near a projector) when the projection screen according to a first aspect of the present invention is used for a transparent projection screen.

BEST MODE FOR CARRYING OUT THE INVENTION

Figure 1A:
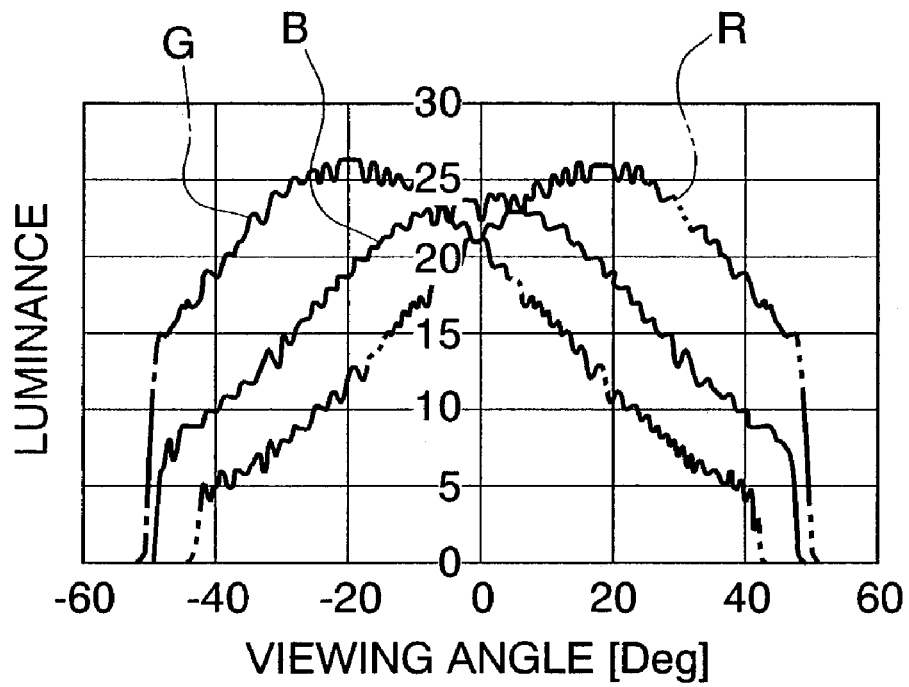
FIG. 1A is a graph showing an optical characteristics of the "single-face lens sheet" having a lens section in which the unit lens (convex lens) is disposed only on one surface.

In the present invention, it is necessary that the pitch in which the unit lens of the lens section 32 near the observer (in right-hand side in the drawing) should be 1/2 or lower than the pitch in which the unit lens of the lens section 31 near the projector and the Fresnel lens (left-hand side in the drawing).

If the above condition is satisfied, at least one unit lens near the observer corresponds to one unit lens near the projector and the Fresnel lens. Therefore, even if strict aligning operation is not performed, the light which is incident to one of unit lens near the lens section 31 orthogonally is emitted through the unit lens in the lens section 32 (FIGS. 5A, 5B).

Figure 5A:
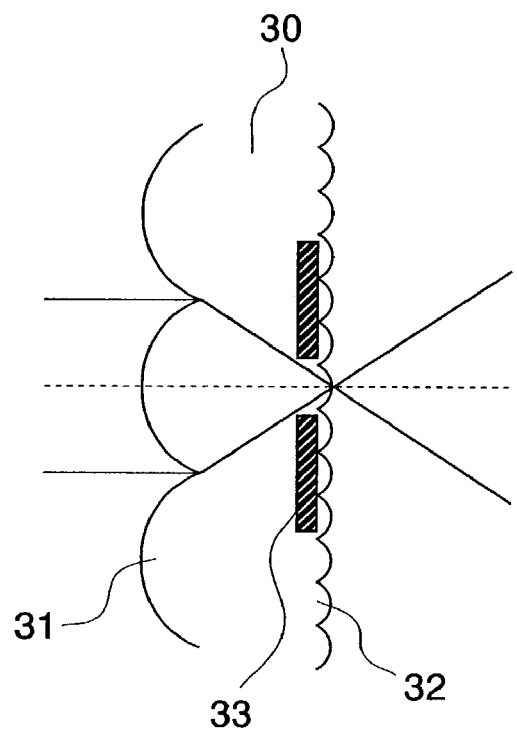
FIGS. 5A and 5B are cross sections showing an example for the double-face lens sheet according to the present invention.
Figure 5B:
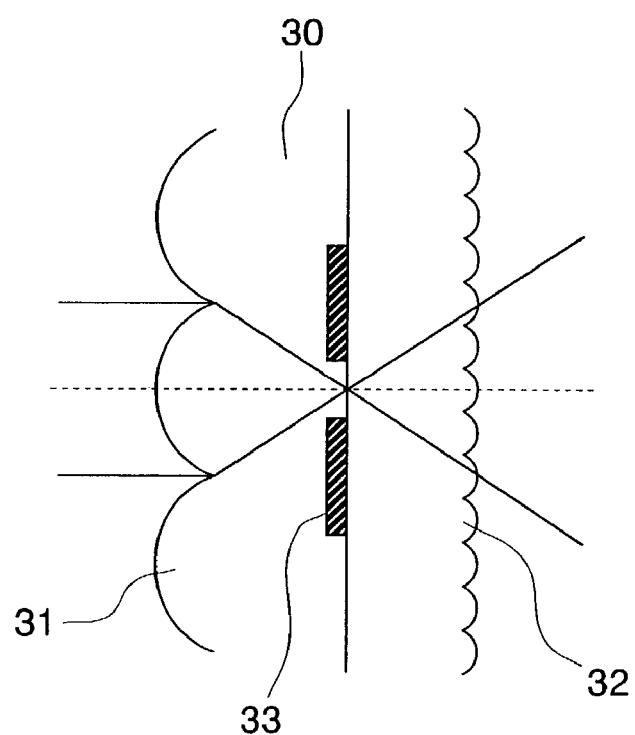

In FIG. 5A, the position of the focal length of the parallel light which is incident to one of the unit lens near the lens section 31 orthogonally is near a top of the one of the unit lens near the lens section 32, that is, an approximate emission surface on the dual-surface lens sheet.

In the drawing, the unit lenses on an incident surface and an emission surface are in a relationship of 1:1. Thus, the parallel light which is incident to one of the unit lens near the lens section 31 under offset manner from the perpendicular angle is emitted through other unit lens which neighbors the lens section 32. Therefore, the unit lenses on an incident surface and an emission surface are in a relationship of 1:1.

The light which is incident under offset manner is equivalent to an image light from the projector of which incidence angles are different.

In FIG. 5B, the position of the focal length of the parallel light which is incident to one of the unit lens near the lens section 31 orthogonally exists in the dual-surface lens sheet. When the parallel light which is incident to one of the unit lens is emitted, the parallel light passes through a plurality of the unit lens near the lens section 32.

In the drawing, a dual-surface lens sheet in which a lens sheet on one of which surface a lens section 31 is formed and the other surface is flat and a lens sheet on one of which surface a lens section 32 is formed and the other surface is flat are layered such that both flat surfaces correspond is shown. The position of the focus is equivalent to an approximate flat surface of the lens sheet on which the lens section 31 if formed.

In the drawing, the unit lenses on an incident surface and an emission surface are in a relationship of 1:n (n is an integer larger than 1).

Before explaining embodiments of the invention, here, light-condensing characteristics corresponding to a shape of the unit lens and chromatic difference of magnification are explained.

Figure 3A:
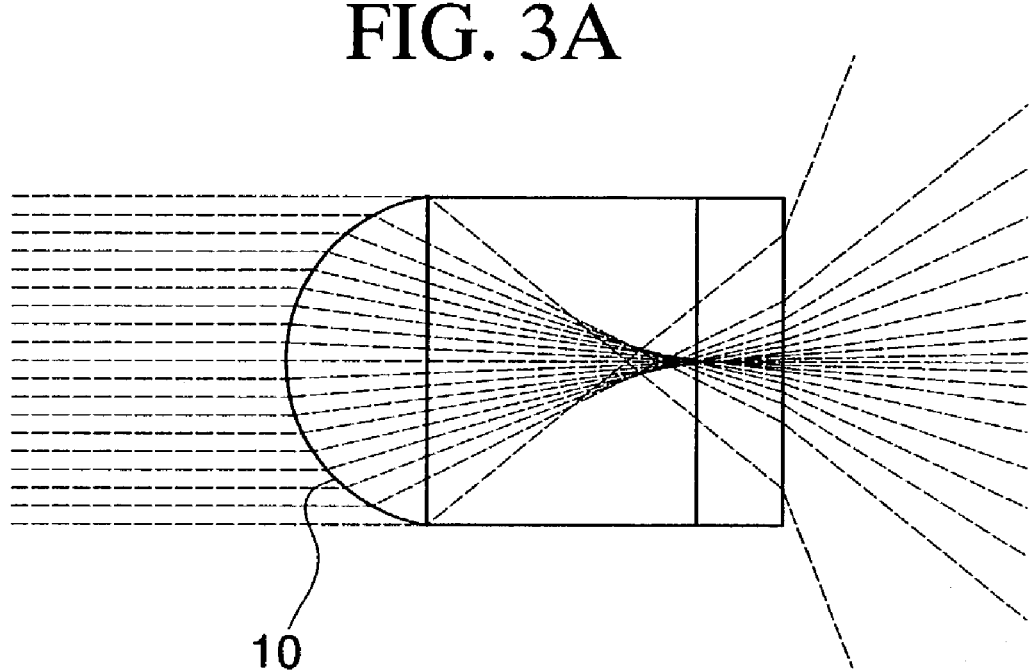
FIG. 3A is a cross section showing an optical path in a case in which a unit lens has a spherical shape (conventional technique).
Figure 3B:
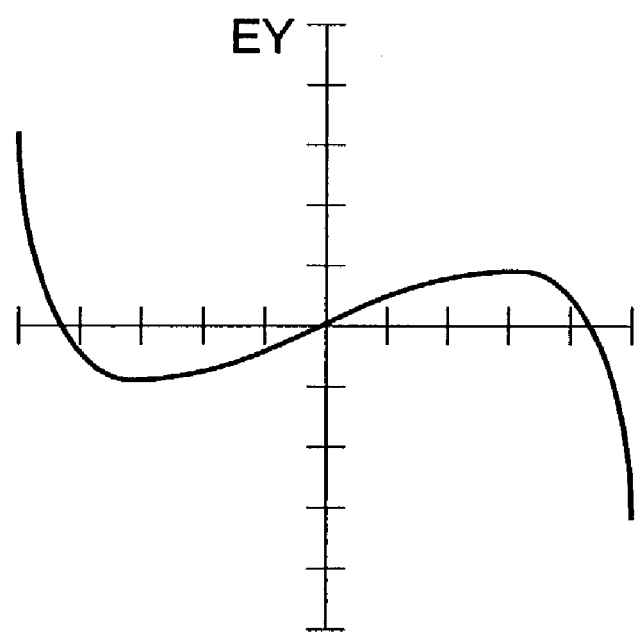
FIG. 3B is a graph showing chromatic difference of magnification.
Figure 4A:
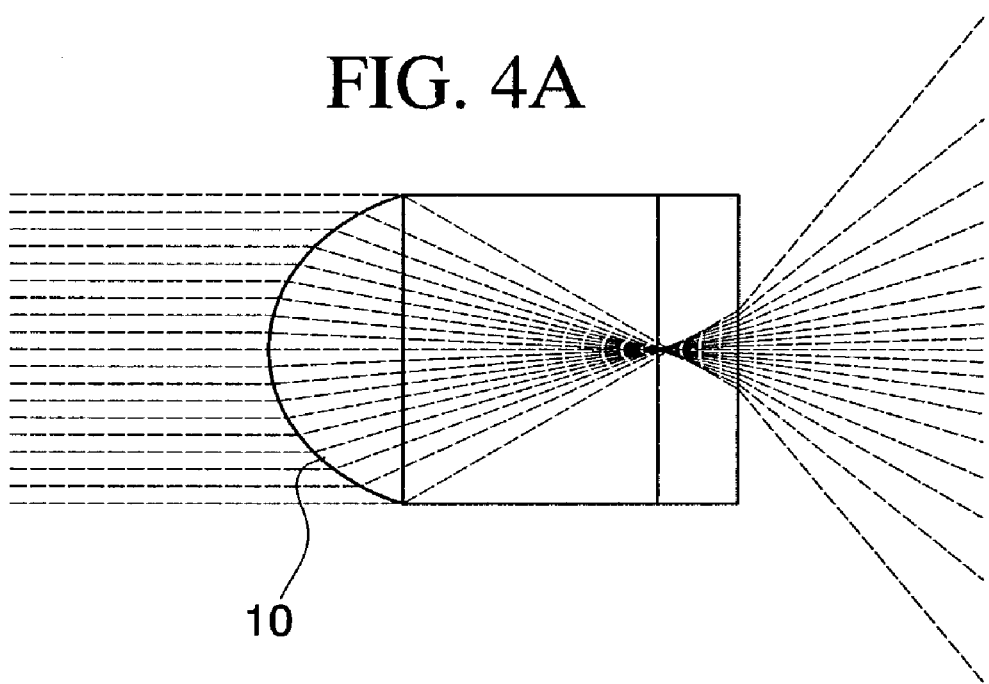
FIG. 4A is a cross section showing an optical path in a case in which a unit lens has an aspherical shape as defined as the present invention.
Figure 4B:
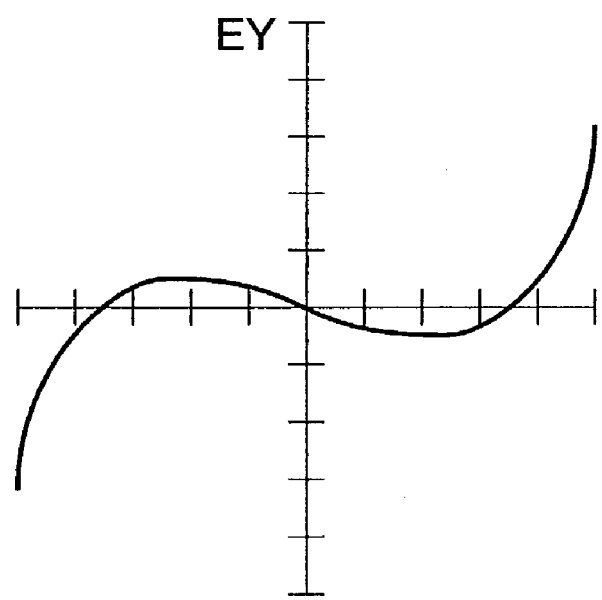
FIG. 4B is a graph showing chromatic difference of magnification.

FIG. 3A is a cross section showing an optical path in a case in which a unit lens has a spherical shape (FIG. 3A) and a graph showing chromatic difference of magnification (FIG. 3B). FIG. 4A is a cross section showing an optical path in a case in which a unit lens has an aspherical shape as defined as the present invention. FIG. 4B is a graph showing chromatic difference of magnification.

According to FIG. 3, parallel lights which are incident to a unit lens 10 from a left-hand-side of the drawing are incident to a surface of a unit lens, and the parallel lights are refracted, then the parallel lights are condensed so as to be focused in a right-hand-side of the drawing. After that, the light is emitted so as to be spread in vertical direction as shown in the drawing.

In this case, the focal length of the lights which are incident in a central area of the unit lens is long (position of focus point is in a right-hand-side in the drawing), and the focal length of the lights which are incident in a marginal area of the unit lens is short (position of focus point is in a left-hand-side in the drawing) because of aberration due to a spherical lens. This is called an axial chromatic aberration.

On the other hand, because of aberration due to a spherical lens, a graph for showing a chromatic difference of magnification: FIG. 3A is obtained under condition that a center of the unit lens is plotted in a horizontal axis such that y=o, and a distance between a position where a the emitted light and a light emitting surface cross is plotted as Δy on a vertical axis (EY) such that when y=0, then Δy=0.

FIGS. 4A and 4B show a case in which the unit lens has a shape in which there is less aberration due to spherical lens. As shown in FIG. 4A, in this case, focus points approximately coincide over a central are to marginal area on the unit lens (there is a less axial chromatic aberration). Accordingly, FIG. 4B indicates that there is a little fluctuation in EY; thus, there is less chromatic difference of magnification.

Figure 6:
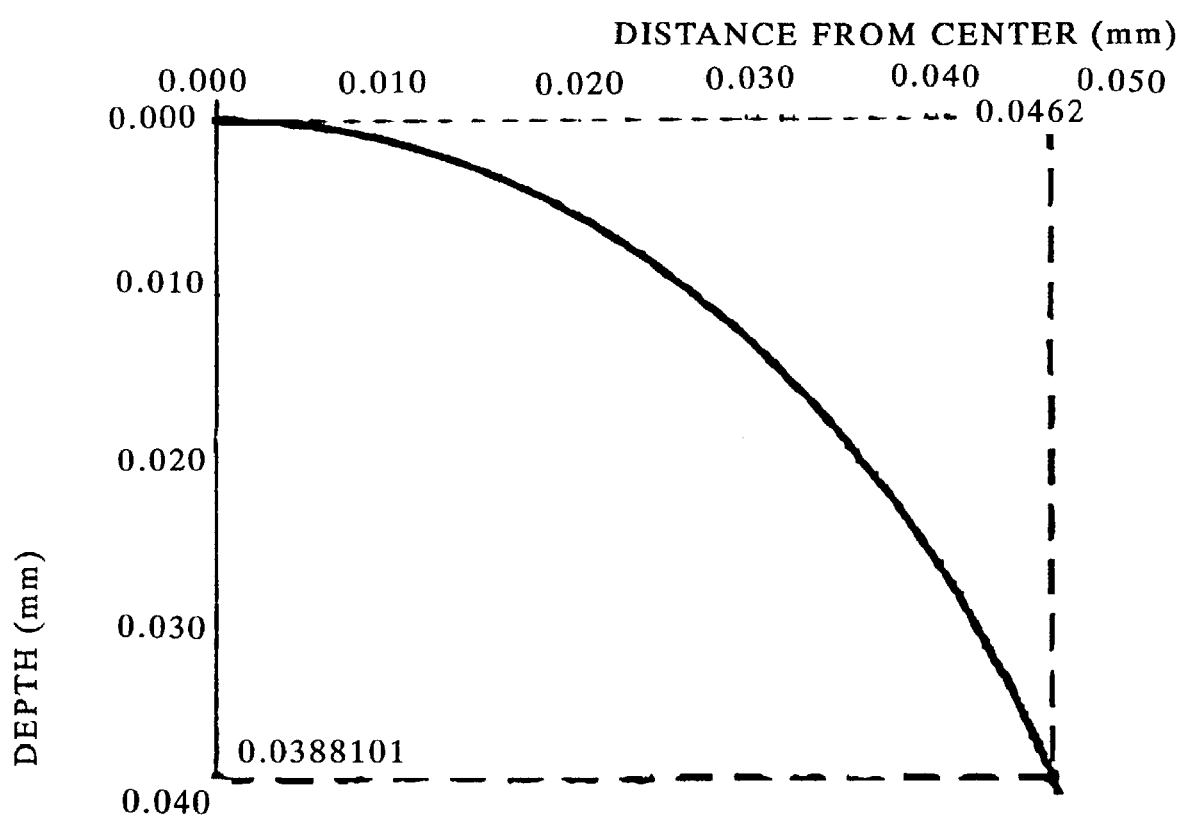
FIG. 6 is a curve showing an example for a cross sectional shape of a unit lens according to the present invention in which there is less chromatic difference of magnification.

FIG. 6 is a curve showing an example for a cross sectional shape of a unit lens according to the present invention in which there is less chromatic difference of magnification.

Here, in the micro-lens sheet according to the present invention, its usage is not limited to a transmission projection screen. That is, the micro-lens sheet according to the present invention can be used for a light guiding member for controlling a lighting light from the light source in a uniform brightness and in a uniform emission direction in a display screen in a display having a built-in light source such as a backlight in a non-large size (30 inch size like in a transmission/reflection projection screen) transmission projection screen.

Operation

According to optical characteristics corresponding to shape of an unit lens, in case of rear projection screen, it is preferable that emission direction of the display light is controlled so as to be wide to an optical axis (normal direction to a screen main surface) in that the perspective scope can be widened without depending on light diffusing agent and a cost for a screen does not increase because a lot of light diffusing agent is not necessary.

In the present invention, light emission angle of each lens is wider than ±30 degrees to an optical axis; therefore, it is possible to obtain necessary perspective angle characteristics for a transmission screen. Furthermore, following operational effect is anticipated.

Improvement in BM Ratio

As explained above, BM pattern can be formed by using light condensing patter by self-alignment method in case in which parallel lights are incident to fine lenses on a micro-lens sheet. In a fine unit lens having chromatic difference of magnification according to the present invention, it is possible to make an aperture area quite small.

Figure 7:
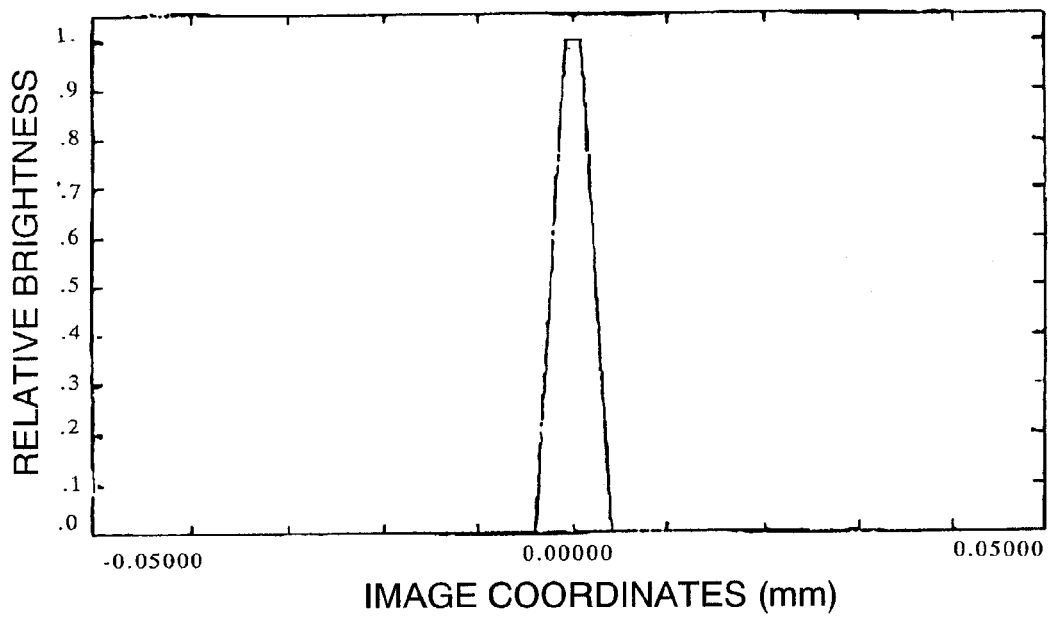
FIG. 7 is a graph showing a distribution of exposure on a BM surface in case in which a unit lens has an aspherical shape as defined in the present invention.

FIG. 7 is a graph showing a distribution of exposure on a BM surface in case in which a unit lens has an aspherical shape as defined in the present invention. Here, the shape of the light condensing section is in a pulse wave form; thus, a borderline between the light condensing section and the non-light-condensing section is clear. In order to form BM by a self-alignment method, it is possible to recognize a shading layer forming section and a shading layer non-forming section according to whether or not there is an adhesive section of the photosensitive adhesive easily. Therefore, it is possible to form a shading pattern clearly. By doing this, it is possible to obtain BM having high shading ratio (75% or higher); thus, it is possible to obtain a screen which can display high contrast image easily.

Under condition that a borderline between a surface on which BM is formed (in case of self-alignment method, a surface of photosensitive member) and a base member for lens sheet is defined as a "focusing surface", by limiting the fluctuation range of the chromatic difference of magnification in 50% of the diameter of a unit lens or lower, it is preferable to form BM in 75% of BM area ratio (shading ratio) or higher. Furthermore, by limiting the fluctuation range of the chromatic difference of magnification in 31% of the diameter of unit lens or lower, it is preferable to form BM in 90% of BM area ratio (shading ratio) or higher. Thus, it is possible to improve not only contrast but also S/N greatly.

Improvement in Product Yield

When BM is formed by self-alignment method, more lights are condensing because of smaller aberration due to spherical lens. Therefore, illumination in the exposed section increases; therefore, S/N to an external light (non-parallel light emitted through the unit lens) improves. As a result, it is possible to obtain a lens sheet having accurate shading pattern which is quite independent to disturbance such as the external lights.

Also, by disposing a lower refractive index layer than that of the lens sheet as a photosensitive member layer, and by adjusting the thickness of the lower refractive index layer, it is possible to adjust the accuracy of BM easily.

Embodiments in the present invention are explained as follows with reference to drawings.

FIRST EMBODIMENT

Figure 12:
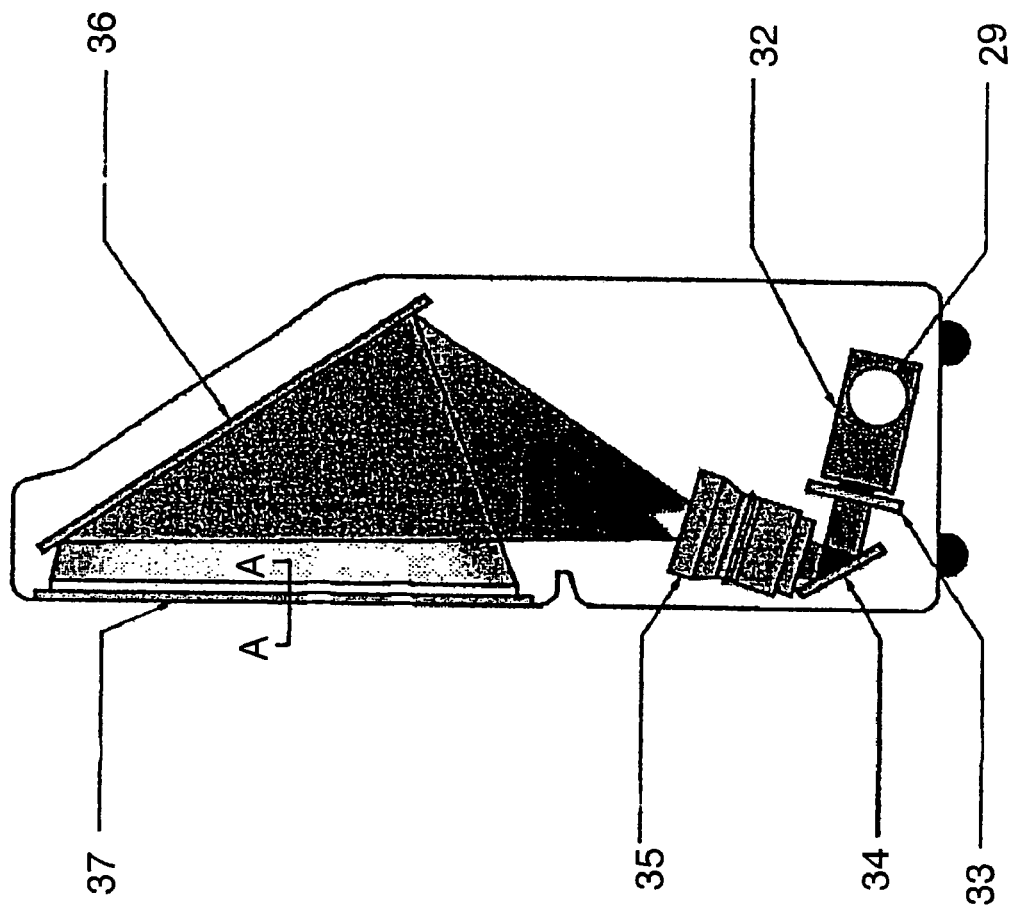
FIG. 12 is an example for a rear projection display device using the dual-surface lens sheet according to the present invention.
Figure 13:
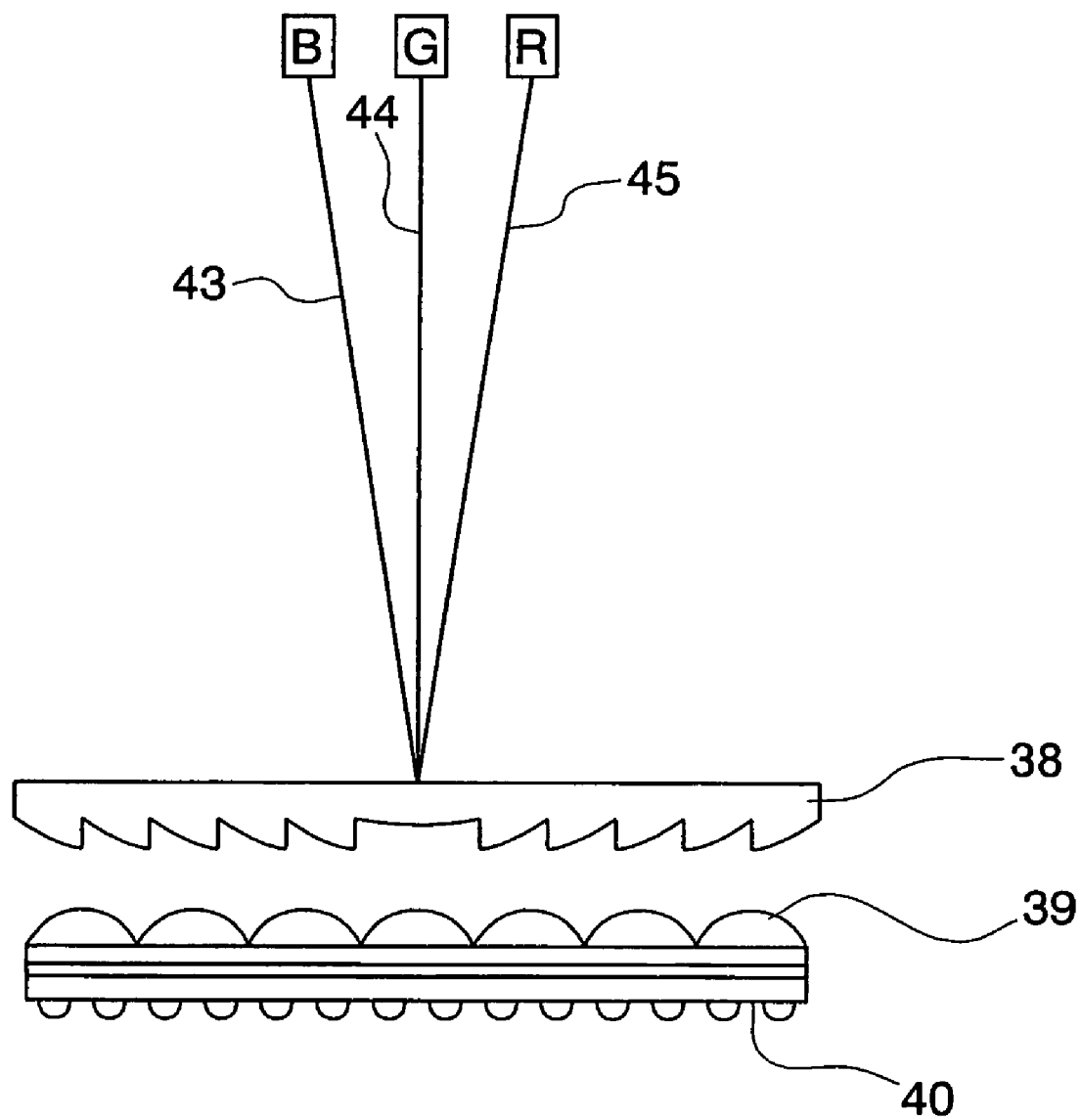
FIG. 13 is a view showing a structure for a screen in the projection display device using the dual-surface lens sheet according to the present invention.

FIG. 12 is a cross section showing a general structure of a liquid crystal rear projection television. Reference numeral 29 is a light source lamp. Reference numeral 32 indicates an optical structural section. Reference numeral 33 indicates a liquid crystal panel. Reference numeral 34 indicates a first mirror. Reference numeral 35 indicates a projecting lens. Reference numeral 36 indicates a second mirror. Reference numeral 37 indicates a screen. FIG. 13 is a cross section viewed in A—A section in the screen 37.

In FIG. 13, reference numeral 38 indicates a Fresnel lens. Reference numeral 39 is a micro-lens. Reference numeral 40 is a black matrix section. Reference numerals 43, 44, and 45 indicated light beams which are projected from image projection devices for three-primary colors such as R, G, and B.

Embodiments of the present invention is explained as follows.

Figure 14A:
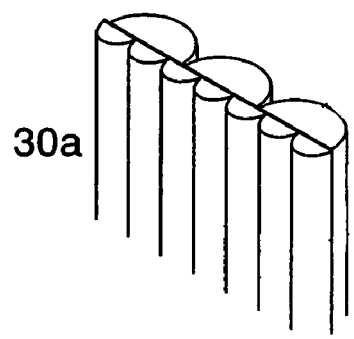
FIGS. 14A to 14C are general views showing each embodiment of the dual-surface lens sheet according to the present invention.
Figure 14B:
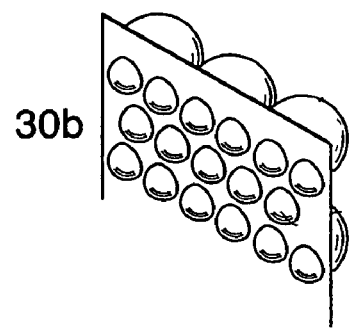
Figure 14C:
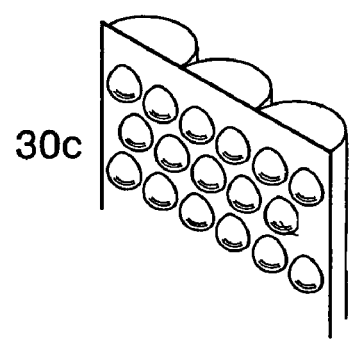
Figure 16:
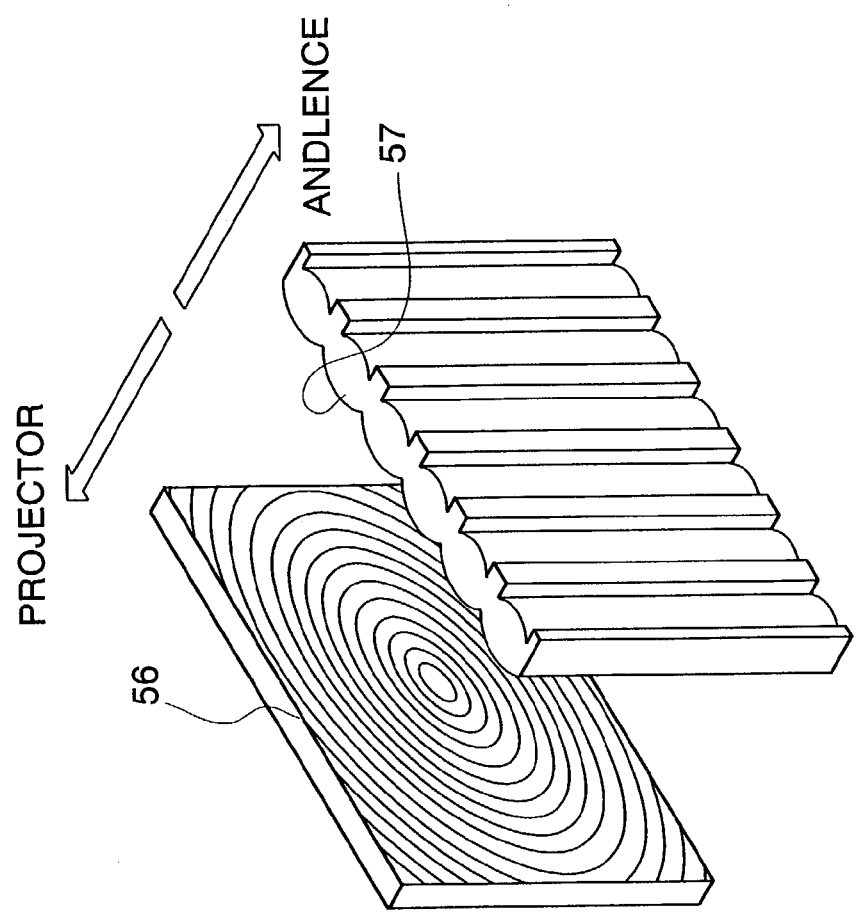
FIG. 16 is a view showing a structure of screen shown in FIG. 15.
Figure 15:
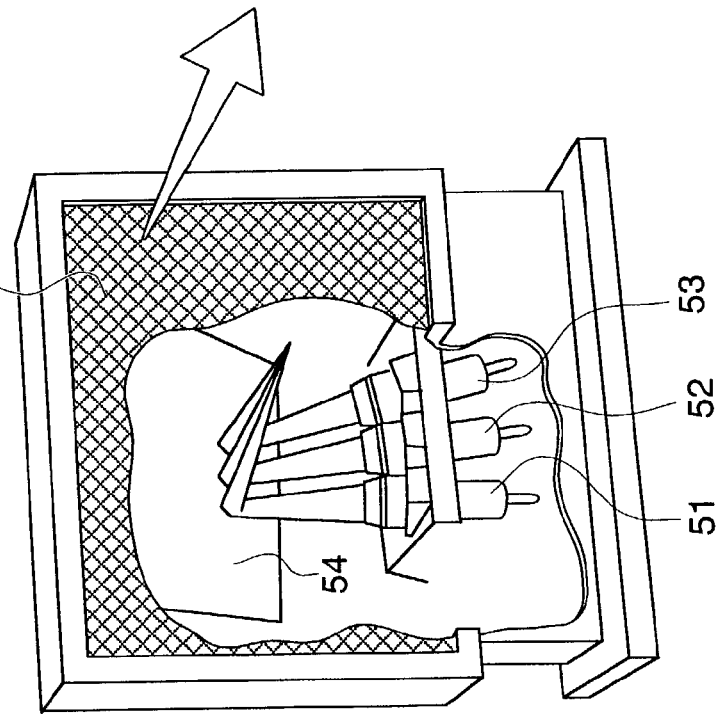
FIG. 15 is a general view for a television which is provided with a conventional three-tube projector.

FIGS. 14A to 14C are views showing dual-lens sheets 30a, 30b, and 30c according to embodiments of the present invention.

The lens sections 31 and 32 can be in any one of following forms (1) to (3) under condition that a front surface (projector and Fresnel lens) is indicated as reference numeral 31 and a back surface (observer) is indicated as reference numeral 32.

A case (1) is a half-column-cylindrical-convex-lens in which longitudinal directions of the lens sections 31, 32 are the same (FIG. 14A).

A case (2) is a micro-lens array section in which the unit lens is disposed in a secondary dimensional approximate matrix (FIG. 14B).

In a case (3), reference numeral 31 indicates the half-column-cylindrical-convex-lens unit, and reference numeral 32 indicates the micro-lens array section in which the unit lens is disposed in a secondary dimensional approximate matrix (FIG. 14C).

Here, as shown in FIGS. 5A and 5B, it is preferable that a shading layer 33 is formed on a non-light-condensing section by each unit lens on a flat surface of at least one of the lens sheet (only a lens sheet on an incident surface in the drawing) away from the lens section so as to improve contrast in the display image when the dual-surface lens sheet is used in a display device having a rear projection screen and a light source such as three-tube CRT projector.

By adapting a micro-lens array section in which the unit lens is disposed under secondary dimensional approximate matrix condition for a unit lens to be used in either one of the front surface or the back surface instead of a half-column-cylindrical-convex-lens, it is not an absolute requirement to provide a light diffusing layer having sufficient light diffusing characteristics in a certain position such as a rear projection screen having a conventional lenticular sheet.

The reason is as follows. In order to control the perspective angle (scope) of the display light by a conventional lenticular sheet, it is possible to control only in a horizontal direction by using the lens function; thus, the control in a vertical direction depends on a light diffusing layer. In contrast, by using the micro-lens array section according to the present invention, it is possible to control the perspective angle (scope) not only in a horizontal direction and a vertical direction but also in every directions.

It is preferable that the disposition pitch of the unit lenses near the lens section 31 is 0.3 mm or narrower, the disposition pitch of the unit lenses near the lens section 32 is 0.15 mm or narrower. In order to form a lens section in fine pitch, it is preferable to use a photo-polymer method (hereinafter called 2P method) by which the lens section made of a reacted hardened product of radioactive-resin-curable-resin is bonded on a surface of a base board.

In a micro-lens array section, a unit lens is disposed on a surface of a base board under an approximate matrix condition. There is no limitation for the disposition method. A matrix disposition in which the unit lenses are neatly disposed under matrix condition, a delta disposition, and a honeycomb disposition can be acceptable (FIGS. 2A to 2D).

Also, it is not necessary that the shape of the unit lens is in a symmetrical and complete round when viewed in a plan view; thus asymmetrical shape is acceptable. Also, in case in which the shape of the unit lens is oval, it is not necessary to align major axis and minor axis in all regions.

Furthermore, cases in which the neighboring unit lenses are contacting or separating are also acceptable.

Also, in order to form a shading layer on a flat surface of the base board which is disposed on the micro-lens sheet so as to be away from the lens section, a method in which a photosensitive layer (a known member of which adhesion is lost by exposing a light) is formed on entire surface of the flat surface, and the photosensitive layer is exposed by the micro-lens array so as to change the characteristics of the photosensitive layer in an area corresponding to a light-condensing section, and ink and a toner are attached to an area as a non-light-condensing section (know method called self-alignment by the lens it self) is preferable so as to form a shading layer in accurate positions (not shown in the drawings).

In the drawings, it is defined that the neighboring unit lens area indicates a case in which unit lenses contact by member (of rectangle such as hexagon, etc.)

Figure 2A:
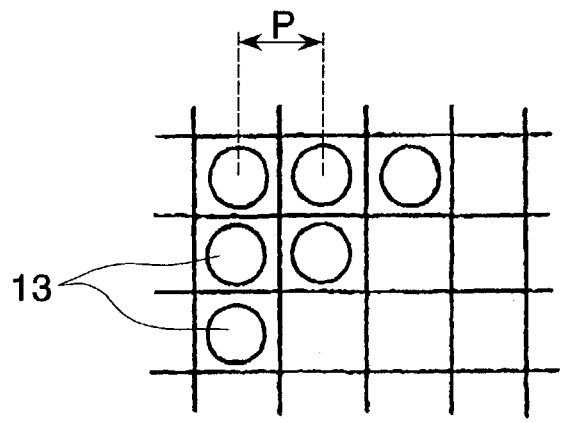
FIGS. 2A to 2D are views showing shapes of the unit lens section of the double-face lens sheet according to the present invention.
Figure 2B:
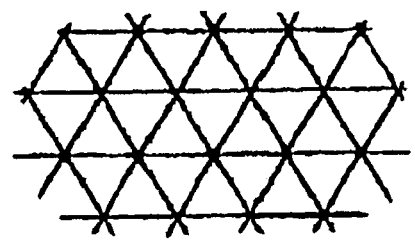
Figure 2C:
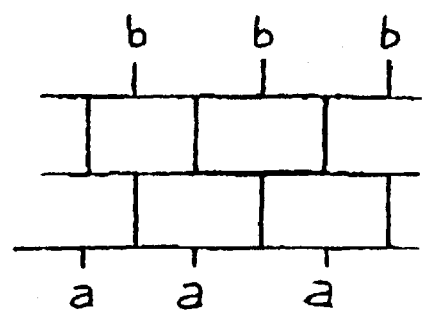

Here, the shape of the unit lens defined in the present invention is rectangle as shown in FIGS. 2A and 2C. In case of FIG. 2B, the shape of the unit lens defined in the present invention is a triangle. In case of FIG. 2D, the shape of the unit lens defined in the present invention is hexagon. In case of FIG. 2A, a lens section (curvature) which is indicated by a circle in the unit lens is provided. It is acceptable that overall unit lens having shapes such as rectangle, triangle, hexagon constructs a lens section (curvature). Here, it is defined that neighboring unit lenses indicate a case in which the unit lenses are contacting by their member of rectangles in a case of FIGS. 2A to 2D. Also, it is defined that disposition pitch between the unit lenses indicates a distance between centers of the unit lenses.

Figure 2D:
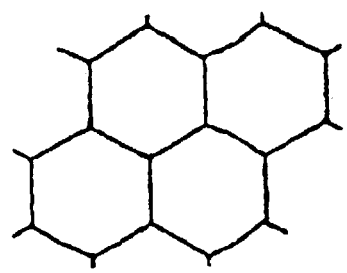

In cases of FIG. 2a (square), FIG. 2B (regular triangle), FIG. 2D (regular hexagon), disposition pitch between the neighboring unit lenses is uniform. In case of FIG. 2C (rectangle), it is understood that the disposition pitch of the unit lenses in an array n and the disposition pitch of the unit lenses in an array n and an array n+1 are different.

Figure 1B:
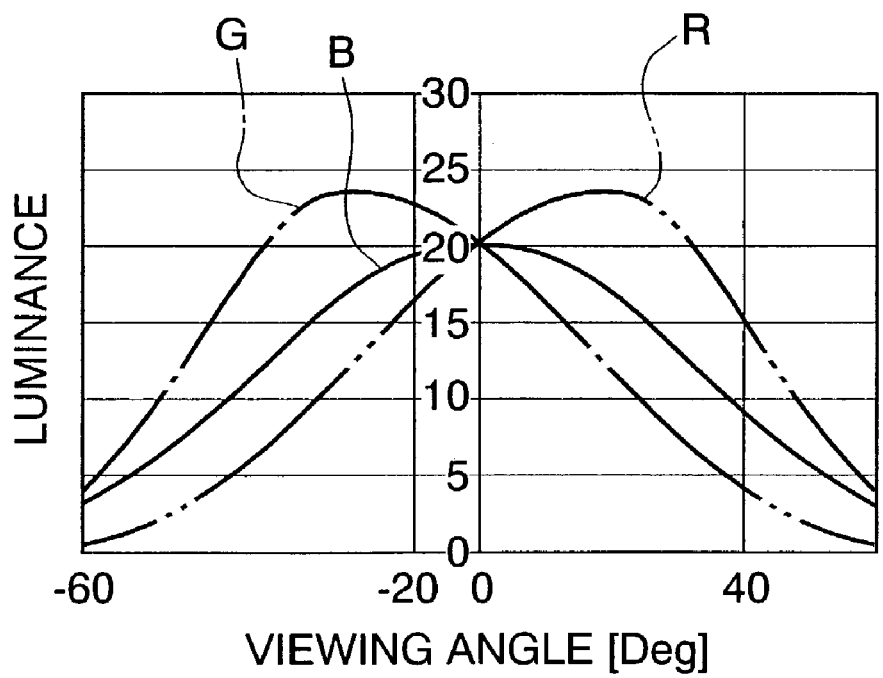
FIG. 1B is a graph showing an optical characteristics of the "double-face lens sheet" according to the present invention having lens sections in which the unit lenses (convex lenses) are disposed on both surfaces.

Here, in case of disposition shown in FIG. 2A, as explained in a case of FIG. 1, it is anticipated that the neighboring unit lenses 13 are contacting. Also, it is anticipated that the neighboring unit lenses 13 are separating.

In cases of dispositions shown in FIGS. 2B, 2C, and 2D, there is a finer periodicity (periodicity of 100 μm made by a combination of period a and period b in an example shown in FIG. 2C) than that of the disposition pitch (tentatively, 100 μm) between the unit lenses 13. Thus, moiré which is caused by pitch ratio in the projected pixel from the projector can be further reduced; therefore, the present invention is superior.

Also, a position of a valley part from a top of the lens (distance from a surface of a base member) is determined by curvature shape of the unit lens. In case in which the unit lens is in a symmetric square shape or symmetric hexagonal shape, such as position differs around the unit lens.

The shape of curvature of the unit lens may be spherical or aspherical. Also, it is necessary to control the shape of the concave section severely such that the diffusing characteristics in a horizontal direction and a vertical direction should be controlled so as to be different each other.

Also, in order to form a shading layer on a flat surface of the base board 11 which is disposed on the micro-lens sheet 10 so as to be away from the lens section, a method in which a photosensitive layer (a known member of which adhesion is lost by exposing a light) is formed on entire surface of the flat surface, and the photosensitive layer is exposed by the micro-lens array so as to change the characteristics of the photosensitive layer in an area corresponding to a light-condensing section, and ink and a toner are attached to an area as a non-light-condensing section (know method called self-alignment by the lens it self) is preferable so as to form a shading layer in accurate positions (not shown in the drawings).

SECOND EMBODIMENT

For a second embodiment according to the present invention, it is preferable that a diameter of the unit lens shown in FIGS. 5A and 5B, and its disposition pitch is 200 μm or narrower so as to form a screen which is preferable for observing a fine resolution image.

Such a fine pitch operation can be obtained by performing a molding operation for forming a lens according to 2P method (photo-polymer method) by using the hardened product of the radioactive-ray-curable-resin.

In an example shown in FIG. 5, a lens section having aspherical shape with 80 μm diameter is formed on one surface of the transparent supporting member 3 having 1.50 refractive index and 75 μm thickness according to 2P method by using the hardened product of the radioactive-ray-curable-resin.

In a case of example shown in the above drawings, the maximum width of the chromatic difference of magnification is 6 μm (7.5% to the diameter of lens); thus, it is possible to form BM with 92.5% of shading ratio.

Even if the same material is used in the same dimension, in case in which the shape of the unit lens is spherical, the maximum width of chromatic difference of magnification is 30 μm (37.5% to the diameter of the lens); thus, the maximum available shading ratio of BM is 62.5%.

By using by one piece of the above micro-lens sheet or a plurality of micro-lens sheet in a connected manner in a rear projection displaying device having 30 inch size or larger, it is possible to watch high contrast image with wider perspective angle.

In case of a micro-lens sheet, comparing to a case of lenticular sheet having cylindrical lens group, the connected part of the lens sheets do not look seamy; thus, there is less disadvantage for a large-size display.

Also, in the above case, a Fresnel lens sheet is disposed to a projector as an image light source, it is possible to shorten the distance between the projector and the screen when parallel lights are incident to the micro-lens sheet. By doing this, it is possible not only to reduce the size of the displaying device but also emit the displaying image light having high brightness only to a necessary range; thus, it is preferable.

Also, in the above case, it is acceptable that a light diffusing layer in which a light diffusing agent is dispersed is disposed in the Fresnel lens and/or the micro-lens sheet.

For a light diffusing agent to be used here, a particle made from inorganic member such as silicon, aluminum, calcium, inorganic powder and glass beads containing oxide of these member, organic member such as acrylic resin, styrene resin, polycarbonate resin, acrylic/styrene copolymer resin can be named.

In order to select the light diffusing agent, it is necessary to take following factors into account such as optical characteristics such as refractive index difference to a binder resin, illumination on its surface, dispersion for forming a light diffusing base member or light diffusing ink, and fragility during a molding operation. For an average diameter of the particle, 5 μm or larger is preferable. More preferably, 5 to 20 μm, further more preferably, 5 to 10 μm is preferable.

By compatibly use the light diffusing layer, it is possible to control the perspective angle by alleviating the steepness of the brightness reduction even in distant observing direction. Also, there is an improvement in focusing function by using gaps (mat surface) in a fine lens array. In addition, there is an improvement in focusing function for image light.

The finer the unit lens is, the more similarly the surface of the lens section of the micro-lens sheet works. Therefore, there is less dependency to the light diffusing layer using the light diffusing agent. In contrast, in a case in which there is not sufficient focusing characteristics and light diffusing characteristics only by the surface of the lens, the light diffusing layer is compatibly used.

Also, for a projection screen, the above micro-lens sheet can be used not only to a rear projection displaying device but also to a front projection displaying device having 30 inch size or larger if the micro-lens sheet.

When the above micro-lens sheet is used for a reflection screen, a light diffusing layer is formed on an entire surface of the micro-lens sheet away from the lens section.

Furthermore, it is possible that the above micro-lens sheet is used for a light guiding member for controlling the lighting light from the light source such that the lighting light is emitted so as be in a uniform brightness in a uniform emitting direction in a display screen.

For such a representative displaying device, a liquid crystal displaying device (monitor or mobile terminals, etc.) having a backlight can be named.

THIRD EMBODIMENT

Embodiments of a projection screen as an example for the present invention is explained as follows with reference to the drawings.

Figure 8A:
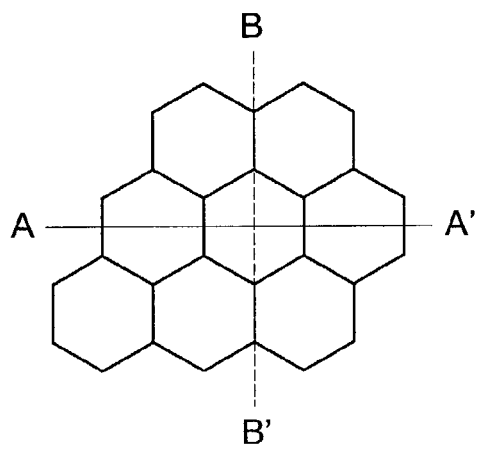
FIGS. 8A and 8B are general views for a micro-lens sheet used in a projection screen according to the present invention.
Figure 8B:
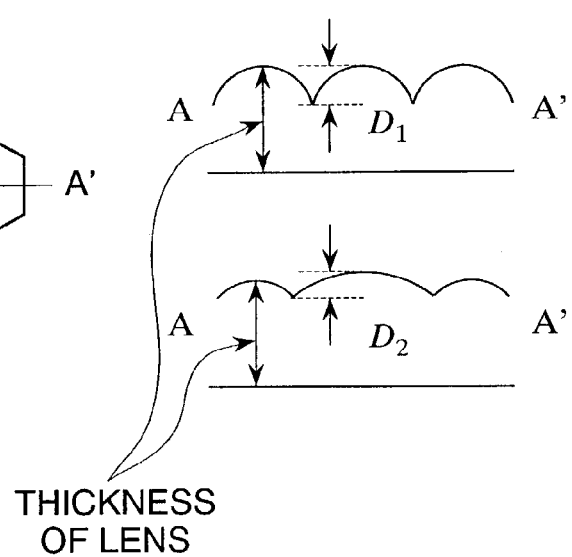

FIGS. 8A and 8B are general views for an element lens of a micro-lens sheet used in a projection screen according to the present invention.

Figure 9:
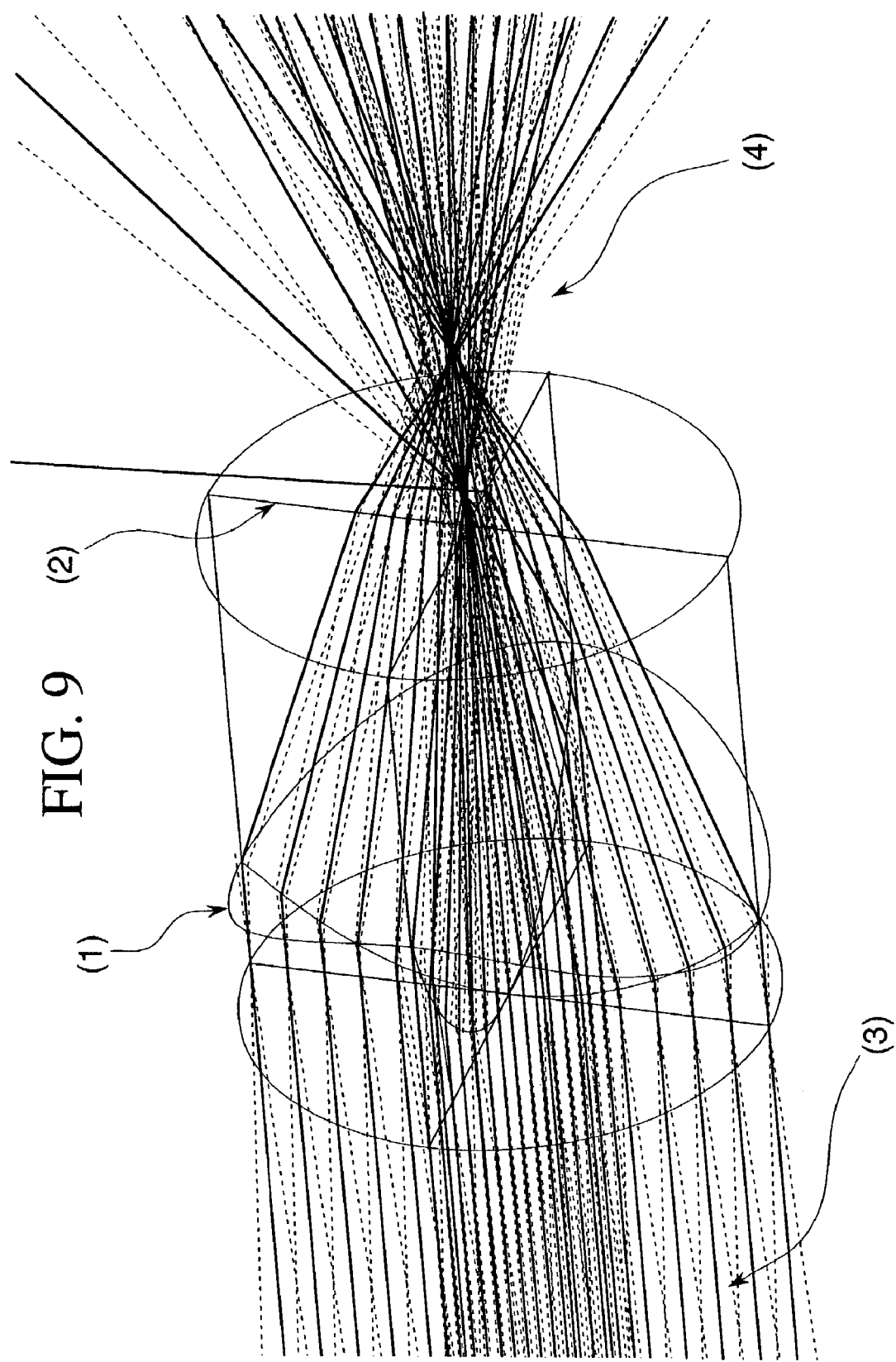
FIG. 9 is a perspective view of an element lens contained in the micro-lens array sheet used in the projection screen according to the present invention.

FIG. 9 is a perspective view of an element lens contained in the micro-lens array sheet used in the projection screen according to the present invention.

Figure 10:
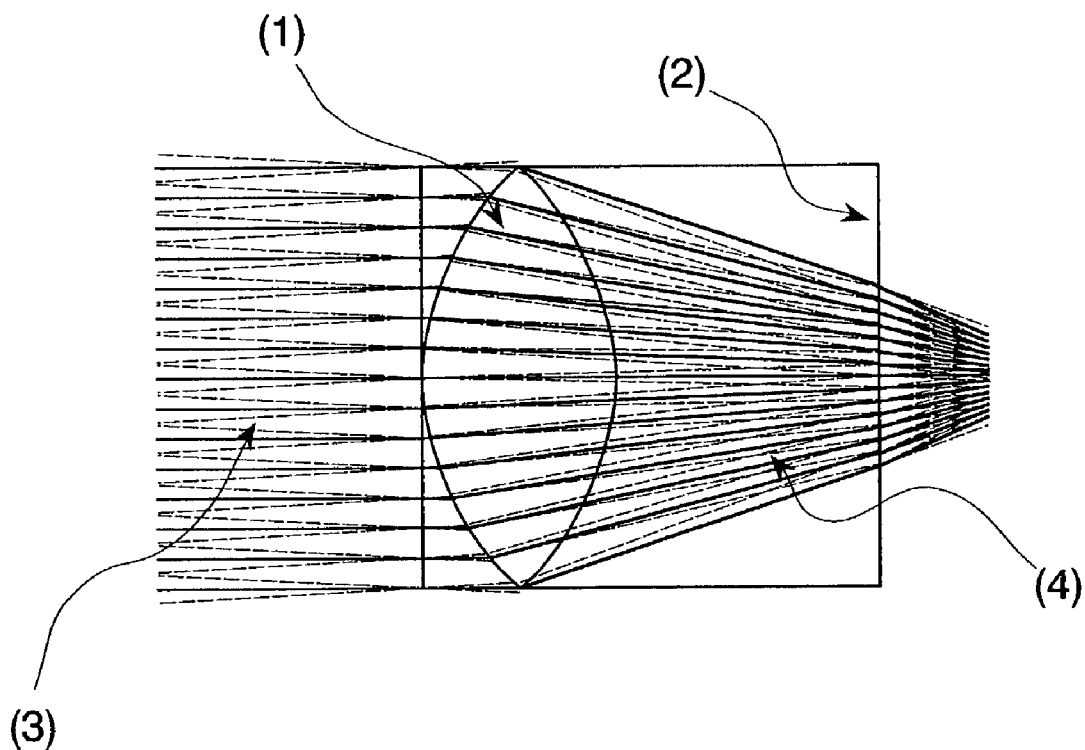
FIG. 10 is a cross section of an element lens in a horizontal direction contained in the micro-lens array sheet used in the projection screen according to the present invention.

FIG. 10 is a cross section of an element lens in a vertical direction contained in the micro-lens array sheet used in the projection screen according to the present invention.

Figure 11:
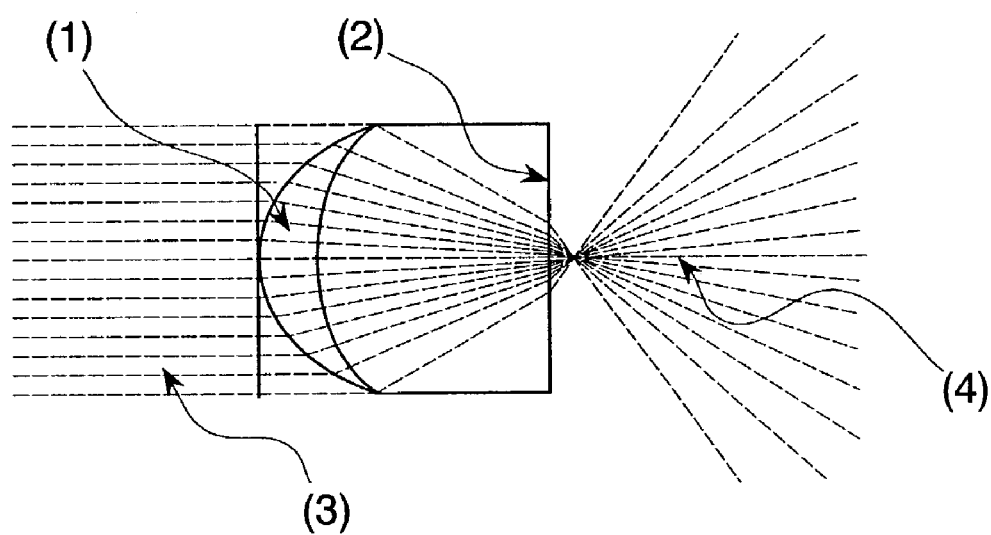
FIG. 11 is a cross section of an element lens in a vertical direction contained in the micro-lens array sheet used in the projection screen according to the present invention.

FIG. 11 is a cross section of an element lens in a horizontal direction contained in the micro-lens array sheet used in the projection screen according to the present invention.

Here, regarding the lens array sheet shown in this embodiment, the shape of the lens are actually designed, and these drawings are made according to these designed lens shape.

In FIG. 8B, thickness (distance from a flat surface which is away from the lens surface to a top of the lens) of an entire lens sheet is uniform. In case of a unit lens having symmetric toric shape, the distance from the top of the lens to a valley part is different in distance D1 in A–A' cross section and distance D2 in B–B' even in the same unit lens.

Main feature of the lens array sheet is in a shape of the element lens contained in the lens array layer. The lens array layer comprises a base member layer in a board manner and a lens layer which is disposed near there.

The element lens contained in the lens array is in an aspherical shape. The element lens also is asymmetrical to an axis of the lens having geometrically three-dimensional shape. In its cross section, aspherical shapes such as not only aspherical shape, but also oval shape, parabolic shape, and an aspherical shape including higher terms are included.

By using such a lens having aspherical and asymmetrical shape, the incident light (3) which is incident in parallel direction to the element lens are refracted according to the incident position on a incident surface (1) due to difference of refraction angle at the time of light emission. As a result, it is possible to differentiate the refractive index of the light to an orthogonal axis of coordinates on a surface which is orthogonal to the optical axis (equivalent to a horizontal axis and a vertical axis in a screen which is disposed perpendicularly); therefore, it is possible to obtain a light distributing characteristics according to the purpose (see FIGS. 10 and 11).

More specifically, as shown in FIGS. 10 and 11, there is a phenomena that the light condensing position of the emitted light (4) is different in a thickness direction. The light emission angle of the light at that time is equivalent to the light distributing angle characteristics.

For a lens array layer, plastic member which is as transparent as plastic member and glass member is preferable. Furthermore, a plastic member which can be limitlessly used for an optical member is more preferable from a production efficiency point of view.

For such a plastic member, acrylic resin such as polymethyl_methacrylate, polycarbonate resin, acrylic-styrene copolymer, styrene resin, polyvinyl chloride resin can be named.

Also, for a member for a lens layer, a radioactive-ray-curable-resin such as an ultraviolet-ray-curable-resin or an electronic-ray-curable-resin should preferably be used because it is possible to perform a fine-pitch-forming operation. For such a radioactive-ray-curable-resin, for example, components containing urethane (meth) acrylate, and/or epoxy (meth) acrylate oligomer to which a reacted diluted agent, photopolymerization starting agent, optical sensitizer are doped can be used. An urethane (meth) oligomer, although there is no particular limitation, can be obtained reacting, by for example, polyols such as ethylene glycol, 1,4-butanediol, neopentyl glycol, polycaprolactone polyol, polyester polyol, polycarbonate diol, polytetramethylene glycol, and polyisocyanates such as hexamethylene diisocyanate, isophorone diisocyanate, tolylene diisocyanate, xylene isocyanate. Epoxy (meth) acrylate oligomer can be obtained by reacting epoxy resins such as bisphenol-A type epoxy resin, bisphenol-F type epoxy resin, phenol novolak type epoxy resin, terminal glycidyl ether of bisphenol-A type propylene oxide adduct, and fluorine epoxy resin and (meth) acrylic acid.

A lens array layer can be produced, for example, as follows. A radioactive-ray-curable-resin is applied on a base member layer made of a plastic member under condition that the radioactive-ray-curable-resin is not hardened. From above there, a molding stamper is pushed, and a predetermined radioactive ray is emitted so as to harden it. Thus, a lens layer is formed.

A molding stamper can form a lens layer, for example, in a following manner. By using a photo-lithography method, at first, a plurality of mask on which a cross sectional shape for the element lens is patterned are prepared. By using the masks, silicon wafers are exposed consequently. After that, by performing an etching operation such as RIE. Patterning operations are repeated in its depth direction; thus, a molding stamper having a designed shape can be obtained.

As explained above, a lens array sheet layer can be produced by the same method as used for producing a conventional lenticular lens.

A photosensitive resin layer and a shading layer can be produced as follows. Fresnel lenses are disposed in parallel under the same condition as the practical use for a projection screen. A light is emitted from the lens layer of the lens array sheet via the Fresnel lenses. The characteristics in the photosensitive resin layer in a part which is exposed by the light which passes through the lens array layer changes, and adhesive characteristics is lost. The, a transfer film having a black transfer layer containing a black carbon is pushed to the photosensitive resin layer. Accordingly, the transfer layer is transferred to an unexposed region having adhesive characteristics selectively. Thus, the shading layer is formed.

The shading layer is formed corresponding to the focusing pattern in a line-segment state due to the light condensation because of the toric micro-lens. The position of such focusing pattern represents an astigmatism due to the toric micro-lens approximately. Therefore, the focusing pattern appears in two points in an optical axis direction (thickness direction). Among these focus points (called, in a field of geometric optics, a sagital focus point and a meridional focus point), the most preferable position for forming the lens sheet is adjusted by performing a sandwiching adjustment for low refractive index layer (otherwise, the lens is designed a such). By disposing a black shading layer in this position, it is possible to obtain a high rate BM pattern. Here, a lower refractive index layer is used. This is because of its weak refractive force; thus it is possible to anticipate larger tolerance for thickness; therefore, it is possible to improve its formability.

Consequently, on this shading layer, by disposing an adhesive agent layer, light diffusing layer, and a hardcoat layer according to necessity, it is possible to obtain a lens array sheet.

As explained above, in this lens array sheet, by preferably designing a shape of one toric lens array, it is possible to control the light distributing characteristics (perspective angle) of a light which transmits through the lens array sheet in both a horizontal direction and a vertical direction. In particular, by making its ratio at ⅔ or lower, it is possible to distribute the vertical/horizontal light distributing characteristics for a preferable projection screen. Thus, it is possible to obtain preferable characteristics for a screen.

Furthermore, it is possible to reduce cost for members used in the production and manufacturing process compared to a case in which two lens layers are used or the lens layers are formed on both surfaces of the base member layer.

Also, by simplifying the light diffusing layer, it is possible to reduce the absorption of the light or decrease of gain in the light diffusing layer. As a result, it is possible to control white-scattering phenomena which is caused by the light diffusing layer; thus, it is possible to realize high S/N ratio.

Furthermore, by adding the Fresnel lens, it is possible to shorten the emission distance from the projector. By establishing such compatibility, it is possible to obtain a superior screen.

Here, there is no particular limitation in factors such as thickness of each layer of the lens array sheet according to the present invention, and pitch of the lens array. These factors can be changed preferably.

EXPERIMENTAL EXAMPLE

The present invention is explained with reference to experimental example more specifically as follows.

In this experimental example, designing parameter is determined as follows. Effect in the present invention is examined.

Designing Parameter

In a base member layer of the lens array layer is made from polyethylene terephthalate with 0.075 mm thickness. Lens layer in the lens array layer is made such that the material is UV photosensitive resin, pitch between the lenses is 0.080 mm, the shape of cross section in which the lens thug (height of convex section of the lens) is large (corresponding to a horizontal direction in the screen) is oval, the cross section in which the lens thug is small is spherical, ratio of thug amount is 2:1 so as to form a toric shape. For a photosensitive resin layer, a Cromalin film (Trademark, registered by DUPONT) having 20 μm thickness is used.

To a surface of the lens on this lens array sheet, parallel light which is collimated in 1 to 5 degrees is emitted so as to perform a patterning operation for the photosensitive layer. Then, a black film having 2 μm thickness (transfer film of carbon black) is transferred so as to be a shading layer; thus, it is possible to obtain a shading layer having an aperture corresponding to a micro-lens contained in the lens array.

The lens array surface of the lens array sheet which is obtained in this way is disposed toward the light source. By using the lens array sheet for diffusing the light, it is possible to observe that the perspective angle corresponding to a shape of the lens array can be obtained respectively.

INDUSTRIAL APPLICABILITY

By using a dual-surface lens sheet according to the present invention is used for a rear projection screen which is used in a display device which uses a plurality of projector as light sources such as a three-tube CRT projector, there are effects in that the color shift is reduced, there is no problem of alignment of the unit lenses on a front surface and a back surface even if the unit lenses are disposed in fine pitch, and manufacturing process can be simplified.

According to the micro-lens sheet in the present invention, it is possible to control the light emission direction (range) of the display light from the lens section so as to be wide in a perspective range by disposing the unit lens group in fine pitch such as 200 μm or shorter.

In particular, according to the present invention, it is easy to form a black matrix with fine pitch such that the borderline between the aperture section and the shading section is clear so as to form a black matrix having high shading rate (75% or higher) on the micro-lens sheet away from the lens section.

Furthermore, according to the micro-lens sheet having a micro-lens array section which is used for the projection screen according to the present invention, it is possible to control the light distributing characteristics of the transmitting light through the lens array layer in a vertical direction and a horizontal direction by preferably changing the shape of toric shape of the element lens. This fact indicates that it is possible to control the optical characteristics of the screen positively; thus, there is a great effect in reducing the time and cost necessary for product development.

Also, it is possible to set the perspective angle independently in a vertical direction and a horizontal direction on one piece of micro-lens sheet desirably. Therefore, (1) it is possible to reduce the cost necessary for production and (2) it is not necessary to develop and prepare the necessary material because the amount of the light diffusing agent can be set according to the available material. Also, (3) it is possible to restrict the absorption of the light (light loss). Therefore, there is an effect in that it is possible to obtain a bright projection screen using the micro-lens sheet easily.

Also, it is possible to reduce the amount of the light diffusing agent comparing a case of the conventional screen. Therefore, reflection and scattering of the external light are restricted; thus, transparency increases. Therefore, light absorbing function in enhanced. Thus, it is possible to obtain a projection screen using the micro-lens sheet having conventionally unrealized improved S/N.

The invention claimed is:

1. A dual-surface lens sheet having periodic gaps contained in lens sections on a front surface and a back surface in a lens sheet wherein pitch ratio of a unit lens on the front surface and the back surface is in a range of 1:2 to 1:30, and a shape of each unit lens is a triangle or a hexagon, wherein:
   the lens sections on the front surface and the back surface are micro-lens array sections in which the unit lenses are disposed in a matrix manner on a plain surface;
   one of the lens sections on the front surface and the back surface is a half-column-cylindrical-convex-lens group and the other lens section is a micro-lens array section in which the unit lenses are disposed utilizing an approximately secondary dimensional matrix;
   pitch in which the unit lens in the half-column-cylindrical-convex-lens group is disposed is 0.3 mm or less;

pitch in which the unit lens in the micro-lens array section is disposed is 0.15 mm or less;

a light emission angle emitted from each unit lens is more than ±30 degrees with respect to a normal of a main surface of the micro-lens array section; and a ratio of a transverse spherical aberration which is caused by each unit lens is designed to be in a range of 0% to 50% of a diameter of the unit lens.

2. A dual-surface lens sheet according to claim 1, wherein the lens sections on the front surface and the back surface are half-column-cylindrical-convex-lenses which are disposed in uniform disposition direction.

3. A dual lens sheet according to claim 1, wherein the micro-lens array section is made of a reacted product of a radioactive-ray-curable-resin and includes the unit lens having aspherical shape.

4. A dual lens sheet according to claim 1, wherein the micro-lens array section includes only a unit lens having aspherical shape.

5. A dual lens sheet according to claim 1, wherein, in the micro-lens array section, optical diffusion by the lens function in each unit lens is different in a horizontal direction and a vertical direction.

6. A dual lens sheet according to claim 1, wherein periodical gaps are formed for forming the lens section on one surface of the micro-lens sheet, the other surface is flat, and the lens sheets are layered such that the flat surfaces of each sheet are corresponding.

7. A micro-lens sheet according to claim 6, wherein a shading layer is formed in an area corresponding to a non-light-condensing section by each unit lens on a flat surface of at least one of the lens sheets away from the lens section.

8. A dual lens sheet according to claim 1, wherein a unit lens having a convex shape is disposed in the lens section, a focusing surface of at least one of the lens sections exists in the dual lens sheet, and parallel lights which are incident to one of the unit lens pass through a plurality of unit lens in the other lens section when emitted from the lens section in the other lens section.

9. A rear projection screen comprising:

a dual-surface lens sheet having periodic gaps contained in a lens section on a front surface and a back surface in a lens sheet wherein a pitch ratio of a unit lens on the front surface and the back surface is in a range of 1:2 to 1:30, and a shape of each unit lens is a triangle or a hexagon; and a Fresnel lens sheet, wherein a pitch of a unit lens on a surface of the dual-surface lens sheet is larger than a pitch of a unit lens on an opposite surface of the dual-surface lens sheet;

a lens section in the dual-surface lens sheet having the larger disposition pitch faces a lens section in the Fresnel lens sheet;

the Fresnel lens sheet is disposed nearer a plurality of projectors than the dual-surface lens sheets;

the lens sections on the front surface and the back surface are micro-lens array sections in which the unit lenses are disposed in a matrix manner on a plain surface;

one of the lens sections on the front surface and the back surface is a half-column-cylindrical-convex-lens group and the other lens section is a micro-lens array section in which the unit lenses are disposed utilizing an approximately secondary dimensional matrix, pitch in which the unit lens in the half-column-cylindrical-convex-lens group is disposed is 0.3 mm or less, and pitch in which the unit lens in the micro-array section is disposed is 0.15 mm or less;

a light emission angle emitted from each unit lens is more than ±30 degrees with respect to a normal of a main surface of the micro-lens array section; and a ratio of a transverse spherical aberration which is caused by each unit lens is designed to be in a range of 0% to 50% of a diameter of the unit lens.

10. A rear projection screen having a three-tube CRT projector as a light source and a rear projection screen according to claim 9.

11. A micro-lens sheet having a micro-lens array section in which unit lenses are disposed in an approximate matrix in a second dimensional manner on at least one surface of a base board wherein a diameter of each unit lens and a disposition pitch of the unit lenses is 200 μm or less, a light emission angle emitted from each unit lens is more than ±30 degrees with respect to a normal of a main surface of the micro-lens sheet, and a ratio of a transverse spherical aberration which is caused by each unit lens is designed to be in a range of 0% to 50% of a diameter of the lens, and a shape of each unit lens is a triangle or a hexagon.

12. A micro-lens sheet according to claim 11, wherein a shading layer is formed on another surface of the base board which is disposed away from the micro-lens array section such that a light-condensing section by each unit lens becomes an aperture section.

13. A micro-lens sheet according to claim 12, wherein the shading layer is formed so as to have an area which is 75% of an entire area of the micro-lens array section or larger.

14. A micro-lens sheet according to claim 12, wherein the shading layer is formed on a surface of the non-light-condensing section on a photo-sensitive resin layer in which the light-condensing section and the non-light-condensing section are formed according to the light-condensation of the micro-lens array section.

15. A micro-lens sheet according to claim 14, wherein the photo-sensitive resin layer is formed on a surface of the base board, which is separated from the micro-lens array section via a transparent resin layer having a lower refractive index than a refractive index of the base board or the photo-sensitive resin layer, is directly formed on a surface of the base board so as to have the lower refractive index than the refractive index of the base board such that the photo-sensitive resin layer is separated from the micro-lens array section.

16. A rear-projection screen having a size that is 30 inches or larger using the micro-lens sheet according to claim 11.

17. A projection screen according to claim 16, wherein the light-diffusion layer in which a light diffusion member is dispersed is disposed near the Fresnel-lens sheet or the micro-lens sheet.

18. A projection screen according to claim 11, wherein the Fresnel-lens sheet is disposed on the projector as a projection light source.

19. A front-projection screen having a size that is 30 inches or larger, and having the micro-lens sheet according to claim 11, wherein the light-reflection layer is disposed on a surface of the base board which is opposite to the lens.

20. A display device having a backlight and having the micro-lens sheet according to claim 11 as a light-guiding member to control a light emission from the light source under condition of uniform brightness or in a uniform emission direction in a display screen.

* * * * *

UNITED STATES PATENT AND TRADEMARK OFFICE
CERTIFICATE OF CORRECTION

| | | |
|---|---|---|
| PATENT NO. | : 7,088,508 B2 | Page 1 of 1 |
| APPLICATION NO. | : 10/344999 | |
| DATED | : August 8, 2006 | |
| INVENTOR(S) | : Kazuyoshi Ebina et al. | |

It is certified that error appears in the above-identified patent and that said Letters Patent is hereby corrected as shown below:

Column 19, Line 57, change "sheets;" to --sheet;--.

Signed and Sealed this

Sixth Day of February, 2007

JON W. DUDAS
*Director of the United States Patent and Trademark Office*